H. I. CARVER.
Combined Butter Worker and Mold.
No. 9,092. Reissued Feb. 24, 1880.
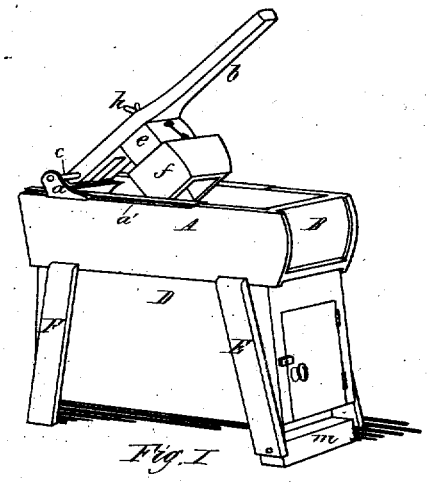
Fig. I
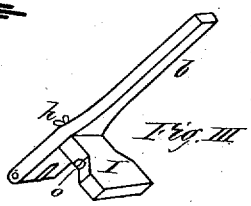
Fig. III
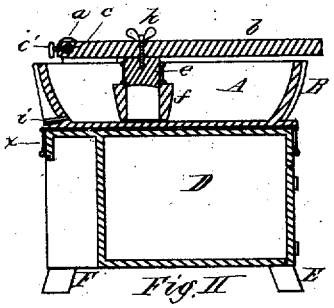
Fig. II
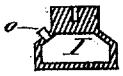
Fig. IV
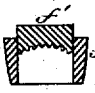
Fig. V
Witnesses.
F. E. Curtis.
E. E. Curtis
Inventor.
Henry I. Carver.
By F. A. Curtis.
his atty.
N. PETERS, PHOTO-LITHOGRAPHER, WASHINGTON, D. C.

UNITED STATES PATENT OFFICE.

HENRY I. CARVER, OF LUDLOW, MASSACHUSETTS.

COMBINED BUTTER WORKER AND MOLD.

SPECIFICATION forming part of Reissued Letters Patent No. 9,092, dated February 24, 1880.

Original No. 203,533, dated May 14, 1878. Application for reissue filed November 24, 1879.

*To all whom it may concern:*

Be it known that I, HENRY I. CARVER, of Ludlow, in the State of Massachusetts, have invented a new and useful Combined Butter Worker and Mold; and I do hereby declare that the following is a full, clear, and exact description thereof, reference being had to the accompanying drawings, making a part of this specification, and to the letters of reference marked thereon.

My invention relates to a device for working butter for the purpose of extracting all the buttermilk, and also to mold the butter into convenient balls for the table and for market; and it consists of a rectangular-shaped tray and a lever pivoted thereto, and having a longitudinal sliding movement along the sides of the tray, and also a lateral movement at right angles to its longitudinal movement, which lever has a hollow plunger adapted to receive and contain water, and which hollow plunger may be detached from said lever and a mold attached in its place, for molding the butter into small balls or pats for the table or for market. The tray rests upon a box or closet connected with the legs, and a rotating block secured on eccentric bearings in the legs serves to tilt the tray to the desired inclination to cause the liquid to run from the tray through an orifice into a suitable receptacle, all which will be more fully hereinafter described.

Figure I is a perspective view of my invention with the mold attached to the lever for molding the butter into balls. Fig. II is a longitudinal vertical section of the same. Fig. III is a perspective view of the lever with the plunger attached thereto for working the butter. Fig. IV is a longitudinal vertical section of the plunger made hollow, and Fig. V is a vertical section of the mold with the point inserted for pushing out the butter from the mold and stamping it.

In the drawings, A represents the tray, having two parallel sides, and with the front end curved upward, like the segment of a hollow cylinder, arranged across the end of the tray A, with the concavity inward, as shown at B, and with a groove, $a'$, made in the exterior of each side A at its upper edge, in which slides the block $a$, one in each groove. This curvature of the end B causes the butter, as it is crowded into the end in being worked, to roll over upward and backward into the tray again. These blocks $a$ are connected by the rod $c$, which passes through the end of the lever $b$, with a set-screw, $c'$, turned into the end of the lever against the rod $c$.

A thumb-screw, $h$, turned through the lever secures a piece, $e$, thereto, and upon the lower end of this is fitted the mold $f$, of the desired form and depth, a rectangular form being deemed the best for a rectangular-shaped tray, which mold is secured in place by a hook and staple or other convenient means.

From this concave shape given to the front end of the tray, in either working the butter or molding it the lower front corner of the plunger or the mold will, if raised nearly to the front upper edge of the end B, pass along down to the lower edge in contact with the inner side and clean off any butter which may have collected thereon.

The tray rests upon the top of a closet, D, and is secured thereto with hooks and staples $x$, and said closet is provided with pieces E and F, and a block, $m$, between the pieces E, is provided with eccentric journals at the ends, which have their bearings in the pieces E, so that when said block is turned with one side downward that lower side bears upon the floor, raising the pieces E from the floor, so that the bottom of the tray will have the proper inclination to cause the liquid in the tray to run out the orifice $i$, and by turning the block with its opposite side downward the pieces E will then rest on the floor.

The plunger I is of a length equal to the width of the tray inside, so that in working the butter it may extend across the tray from one side to the other and operate upon the butter the whole width of the tray.

I prefer to make the plunger hollow, so that in cold weather warm water may be poured into it at the orifice $o$ and a stopper put in, whereby the plunger may be somewhat heated and warm the butter, making it easier to work; and in warm weather cold water may be poured in to cool the butter.

When the plunger I is attached to the lever the butter is worked by raising the lever and forcing the plunger down into the butter, the blocks $a$ sliding along in their guides, so that the plunger may reach all parts of the tray. After the butter is thoroughly worked the plunger is detached by turning out the screw *h* and attaching the piece *e* and mold *f*.

By working the lever in a vertical direction and pressing the mold down into the butter all along the tray the mold is filled with a solid mass of butter.

The lever *b* may be set in a position on its fulcrum-rod *c*, so that the mold may be pressed down into and take up all the butter along the entire length of one side of the tray, and then be moved along its fulcrum-rod *c*, so that all the butter along the other side of the tray may be molded. Each time the mold *f* is filled with butter it is unfastened and removed from the piece *e*, and the print *f'* (which is a block fitted to slide through the mold and ornamented on its lower face) is inserted in the top of the mold and pressed down against the top of the butter, which prints or ornaments the top of the ball and forces it out of the mold, ready for the table or for the market.

I am aware that butter-workers having a plunger attached to a vertically-moving lever have heretofore been made and used, and also that butter-molds attached to a lever and moving horizontally in the arc of a circle upon a fixed pivot as a center have also been used, and I do not claim the same nor any part thereof irrespective of my construction and arrangement of the same; but, Having described my invention, what I claim as new is—

1. In combination with a rectangular-shaped tray, a pivoted lever having both a longitudinal movement and a lateral or side movement in a direction at right angles to its longitudinal movement, and a molding-plunger secured to said lever and operated thereby, substantially as and for the purpose specified.

2. The combination, in a butter-worker, of a rectangular-shaped tray, a lever having a longitudinal sliding movement along the sides of said tray, and also a lateral movement at right angles to said longitudinal movement, and a hollow plunger adapted to be secured to and be operated by said lever, and also to contain water while working the butter, substantially as described.

HENRY I. CARVER.

Witnesses:
T. A. CURTIS,
F. E. HALL.